United States Patent
Freeman et al.

(10) Patent No.: US 10,655,482 B2
(45) Date of Patent: May 19, 2020

(54) VANE ASSEMBLIES FOR GAS TURBINE ENGINES

(71) Applicants: Rolls-Royce North American Technologies, Inc., Indianapolis, IN (US); Rolls-Royce Corporation, Indianapolis, IN (US)

(72) Inventors: Ted J. Freeman, Danville, IN (US); Jeffrey A. Walston, Indianapolis, IN (US); Jun Shi, Carmel, IN (US); Tara G. Schetzel, Indianapolis, IN (US)

(73) Assignees: Rolls-Royce Corporation, Indianapolis, IN (US); Rolls-Royce North American Technologies Inc., Indianapolis, IN (US)

( * ) Notice: Subject to any disclaimer, the term of this patent is extended or adjusted under 35 U.S.C. 154(b) by 784 days.

(21) Appl. No.: 15/015,690

(22) Filed: Feb. 4, 2016

(65) Prior Publication Data

US 2016/0230576 A1 Aug. 11, 2016

Related U.S. Application Data

(60) Provisional application No. 62/113,312, filed on Feb. 5, 2015.

(51) Int. Cl.
| | | |
|---|---|---|
| *F01D 9/04* | (2006.01) | |
| *F04D 29/54* | (2006.01) | |
| *F04D 29/64* | (2006.01) | |
| *F04D 29/02* | (2006.01) | |

(52) U.S. Cl.
CPC .............. *F01D 9/041* (2013.01); *F01D 9/044* (2013.01); *F04D 29/023* (2013.01); *F04D 29/542* (2013.01); *F04D 29/644* (2013.01); *F05D 2230/232* (2013.01); *F05D 2240/12* (2013.01); *F05D 2300/6033* (2013.01); *Y02T 50/672* (2013.01)

(58) Field of Classification Search
CPC .......... F01D 9/041; F01D 9/044; F01D 9/042; F01D 9/047; F01D 25/005; F01D 25/162; F04D 29/023; F04D 29/542; F04D 29/644; F05D 2230/232; F05D 2240/12; F05D 2300/6033; Y02T 50/672
USPC ........................................................ 415/191
See application file for complete search history.

(56) References Cited

U.S. PATENT DOCUMENTS

| | | | | |
|---|---|---|---|---|
| 730,363 | A * | 6/1903 | Geisenhoner | ........... F01D 5/225 29/889.21 |
| 1,470,503 | A * | 10/1923 | Steenstrup | ............ B23P 15/006 29/889.21 |
| 1,547,838 | A * | 7/1925 | Steenstrup | ............. B22D 19/00 164/108 |
| 2,110,679 | A * | 3/1938 | Robinson | ................ F01D 5/141 415/208.1 |
| 2,622,790 | A * | 12/1952 | McLeod | ................ F01D 9/042 220/23.2 |

(Continued)

*Primary Examiner* — Woody A Lee, Jr.
*Assistant Examiner* — Brian Christopher Delrue
(74) *Attorney, Agent, or Firm* — Barnes & Thornburg LLP (57) ABSTRACT

A vane ring for a gas turbine engine includes an outer end wall and a plurality of spars coupled to the outer end wall. The vane ring further includes an inner end wall positioned radially inward of the outer end wall and coupled to the spars. The outer and inner end walls cooperate to form a flowpath.

19 Claims, 4 Drawing Sheets

(56) References Cited

U.S. PATENT DOCUMENTS

| | | | | |
|---|---|---|---|---|
| 2,925,998 A * | 2/1960 | Hayes | F01D 9/042 | 29/889.22 |
| 2,928,586 A * | 3/1960 | Hart | F01D 9/042 | 415/209.1 |
| 3,075,744 A * | 1/1963 | Peterson | F01D 5/182 | 415/115 |
| 3,909,157 A * | 9/1975 | Wachtell | B23P 6/005 | 29/889.1 |
| 4,195,396 A * | 4/1980 | Blazek | B23P 15/04 | 164/122.1 |
| 4,376,004 A * | 3/1983 | Bratton | F01D 5/184 | 156/89.27 |
| 4,464,094 A * | 8/1984 | Gerken | B23P 15/006 | 164/122 |
| 4,643,636 A | 2/1987 | Libertini et al. | | |
| 4,728,258 A * | 3/1988 | Blazek | B22C 9/04 | 415/137 |
| 4,987,944 A * | 1/1991 | Parks | B22C 9/04 | 164/10 |
| 5,197,856 A * | 3/1993 | Koertge | F01D 25/246 | 415/199.4 |
| 5,226,789 A | 7/1993 | Donges et al. | | |
| 5,332,360 A * | 7/1994 | Correia | F01D 9/042 | 29/889.21 |
| 5,560,841 A * | 10/1996 | DeMichael | B23K 11/22 | 219/85.1 |
| 5,788,456 A * | 8/1998 | Maier | F01D 9/042 | 29/889.22 |
| 6,164,903 A * | 12/2000 | Kouris | F01D 9/04 | 415/135 |
| 6,200,092 B1 * | 3/2001 | Koschier | F01D 5/146 | 415/191 |
| 6,315,941 B1 * | 11/2001 | Keller | B22C 3/00 | 249/175 |
| 6,375,415 B1 * | 4/2002 | Burdgick | F01D 5/18 | 415/115 |
| 6,884,030 B2 * | 4/2005 | Darkins, Jr. | F01D 9/042 | 29/889.22 |
| 7,114,917 B2 | 10/2006 | Legg | | |
| 7,452,182 B2 | 11/2008 | Vance et al. | | |
| 7,553,126 B2 * | 6/2009 | Charier | F01D 17/14 | 415/128 |
| 7,914,255 B2 * | 3/2011 | Workman | F01D 9/042 | 29/889.22 |
| 8,206,096 B2 | 6/2012 | Prentice et al. | | |
| 8,226,360 B2 * | 7/2012 | Scoggins | F01D 9/041 | 415/191 |
| 8,770,931 B2 * | 7/2014 | Alvanos | C04B 37/001 | 29/889.22 |
| 8,794,912 B2 * | 8/2014 | Nilsson | F01D 9/04 | 415/191 |
| 9,303,531 B2 * | 4/2016 | Hasting | F01D 9/042 | |
| 9,624,786 B2 * | 4/2017 | Xu | B23K 1/0006 | |
| 9,651,129 B2 * | 5/2017 | Dattawadkar | F16H 41/28 | |
| 9,683,581 B2 * | 6/2017 | Harron | F01D 5/16 | |
| 9,970,317 B2 * | 5/2018 | Freeman | F01D 25/005 | |
| 2005/0254942 A1 * | 11/2005 | Morrison | F01D 5/282 | 415/200 |
| 2007/0140845 A1 * | 6/2007 | Marke | F01D 9/06 | 415/232 |
| 2009/0220331 A1 * | 9/2009 | Shapiro | F01D 9/042 | 415/115 |
| 2010/0111678 A1 | 5/2010 | Habarou et al. | | |
| 2010/0111682 A1 * | 5/2010 | Scoggins | F01D 9/041 | 415/191 |
| 2010/0132374 A1 * | 6/2010 | Manteiga | F01D 9/02 | 60/796 |
| 2011/0110772 A1 | 5/2011 | Arrell et al. | | |
| 2012/0128482 A1 * | 5/2012 | Dezouche | F04D 29/542 | 415/209.2 |
| 2012/0301285 A1 | 11/2012 | Suciu et al. | | |
| 2012/0301303 A1 | 11/2012 | Alvanos et al. | | |
| 2013/0094951 A1 | 4/2013 | McCaffrey | | |
| 2016/0290147 A1 * | 10/2016 | Weaver | F02C 3/04 | |

* cited by examiner

VANE ASSEMBLIES FOR GAS TURBINE ENGINES

CROSS REFERENCE TO RELATED APPLICATIONS

This application claims priority to and the benefit of U.S. Provisional Patent Application No. 62/112,312, filed 5 Feb. 2015, the disclosure of which is now expressly incorporated herein by reference.

FIELD OF THE DISCLOSURE

The present disclosure relates generally to gas turbine engines, and more specifically to static vane rings used in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, a fan assembly. Left-over products of the combustion are exhausted out of the turbine and may provide thrust in some applications.

Compressors and turbines typically include alternating stages of static vane rings and rotating wheel assemblies. The static vane rings may be exposed to high temperatures from products of the combustion reaction in the combustor. Such vane rings sometimes include components made from materials that have different coefficients of thermal expansion. Due to the differing coefficients of thermal expansion, the components of some vane rings expand at different rates when exposed to combustion products. For example, coupling such components with traditional methods may not allow for the differing levels of expansion and contraction during operation of the gas turbine engine.

SUMMARY

The present application discloses one or more of the features recited in the appended claims and/or the following features which, alone or in any combination, may comprise patentable subject matter.

According to a first aspect of the present disclosure, a vane ring for use in a gas turbine engine may include a plurality of metal spars, a plurality of inner end wall segments positioned to function as a continuous hoop and engage the metal spars, and a unitary outer end wall forming a one-piece continuous hoop. Each spar may include a web section having an airfoil shape, a first end connector coupled to a radially outer portion of the web section, and a second end connector coupled to a radially inner portion of the web section. Each inner end wall segment may include a first flow surface positioned to guide expanding hot gases along a flow path through the gas turbine engine and at least one locator hole sized to receive the second end connector of the metal spars. The outer end wall may comprise ceramic-matrix materials. The outer end wall may include a second flow surface positioned to cooperate with the first flow surface of the inner end wall segments to form the flow path and a plurality of locator holes sized to receive the first end wall connectors to locate the metal spars circumferentially along the outer end wall.

In illustrative embodiments, the vane ring may further comprise a plurality of outer end caps coupled to the first end connectors and positioned to engage a radially outer surface of the outer end wall.

In illustrative embodiments, the outer end caps may be coupled to the first end connectors by one of welding, brazing, a bi-cast joint, or a fastener.

In illustrative embodiments, the vane ring may further comprise a plurality of inner end caps coupled to the second end connectors and positioned to engage a radially inner surface of the inner end wall segments. The outer end caps and inner end caps may cooperate to locate the outer end wall, the metal spars, and the inner end wall segments between the outer and inner end caps.

In illustrative embodiments, the inner end caps may be coupled to the second end connectors by one of welding, brazing, a bi-cast joint, or a fastener.

In illustrative embodiments, the outer end caps may include a body for engaging the outer end wall and at least one locator tab coupled to the body. The locator tab may be positioned to engage an outer case of the gas turbine engine to locate the vane ring within the gas turbine engine.

In illustrative embodiments, the first end connector may be offset from an exterior surface of the web section that defines the airfoil shape of the web section to form a first shoulder for engaging the outer end wall to locate the metal spar relative to the outer end wall.

In illustrative embodiments, the second end connector may be offset from an exterior surface of the web section that defines the airfoil shape of the web section to form a second shoulder for engaging the inner end wall segments to locate the inner end wall segments relative to the outer end wall.

In illustrative embodiments, the vane ring may further comprise a plurality of ceramic web skins positioned to surround the web sections of the metal spars and located between the outer end wall and inner end wall segments. Each web skin may comprise ceramic-matrix materials and may have an airfoil shape.

In illustrative embodiments, the inner end wall segments may comprise ceramic-matrix materials.

In illustrative embodiments, the inner end wall segments may comprise metallic materials.

According to another aspect of the present disclosure, a vane ring for use in a gas turbine engine may include a plurality of metal spars, a unitary outer end wall forming a one-piece continuous hoop, and a plurality of ceramic web skins positioned to surround web sections of the metal spars. Each spar may include a web section having an airfoil shape and an end connector coupled to the web section. The outer end wall may comprise ceramic-matrix materials. The outer end wall may include a flow surface positioned to guide expanding hot gases along a flow path through the gas turbine engine and a plurality of locator holes formed through the flow surface. The locator holes may be sized to receive the end connectors of the metal spars to locate the metal spars circumferentially along the outer end wall.

In illustrative embodiments, the vane ring may further comprise a plurality of inner end wall segments positioned to function as a continuous hoop radially inward of the outer end wall and engage the metal spars. Each inner end wall segment may include a flow surface positioned to guide expanding hot gases along the flow path.

In illustrative embodiments, the ceramic web skins may be positioned within the flow path between the outer end wall and inner end wall segments.

In illustrative embodiments, the vane ring may further comprise a plurality of outer end caps coupled to the end connectors and positioned to engage a radially outer surface of the outer end wall.

In illustrative embodiments, the outer end caps may be coupled to the first end connectors by one of welding, brazing, a bi-cast joint, or a fastener.

In illustrative embodiments, the outer end caps may include a body for engaging the outer end wall and at least one locator tab coupled to the body. The locator tab may be positioned to engage an outer case of the gas turbine engine to locate the vane ring within the gas turbine engine.

In illustrative embodiments, the end connector may be offset from an exterior surface of the web section that defines the airfoil shape of the web section to form a first shoulder for engaging the outer end wall to locate the metal spar relative to the outer end wall.

According to another aspect of the present disclosure, a vane ring for use in a gas turbine engine is taught. The vane ring may include a plurality of metal spars. Each spar may include a web section having an airfoil shape, a first end connector coupled to a radially outer portion of the web section, and a second end connector coupled to a radially inner portion of the web section In illustrative embodiments, the vane ring may also include a unitary inner end wall and a plurality of outer end wall segments. The unitary inner end wall may form a one-piece continuous hoop and may comprising ceramic-matrix materials. The inner end wall may include a first flow surface positioned to guide expanding hot gases along a flow path through the gas turbine engine and at least one locator hole sized to receive the first end connector of the metal spars. The plurality of outer end wall segments may be positioned to function as a continuous hoop and may engage the metal spars. Each inner end wall segment may include a second flow surface positioned to cooperate with the first flow surface of the outer end wall segments to form the flow path and a plurality of locator holes sized to receive the second end wall connectors to locate the metal spars circumferentially along the inner end wall.

In illustrative embodiments, the vane ring may include a plurality of inner end caps. The inner end caps may be coupled to the first end connectors and positioned to engage a radially outer surface of the inner end wall.

According to another aspect of the present disclosure, a method of assembling a vane ring for use in a gas turbine engine may include passing an end connector of a metal spar through a locator hole formed through an outer end wall and coupling an outer end cap to the end connector of the metal spar. The outer end wall may comprise ceramic-matrix materials. The outer end wall may be unitary to form a one-piece continuous hoop. The metal spar may include a web section having an airfoil shape and coupled to the end connector. The outer end cap may be positioned to trap the outer end wall between the outer end cap and web section of the metal spar.

In illustrative embodiments, the method may further comprise engaging the metal spar with an inner end wall and coupling an inner end cap to the metal spar to trap the inner end wall between the inner end cap and web section of the metal spar.

These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figure 1:
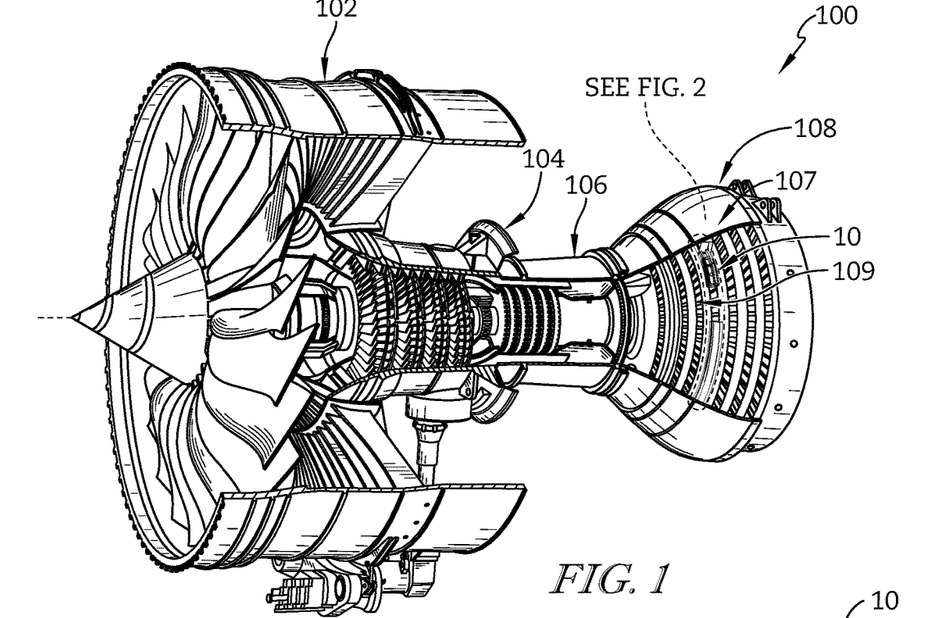
FIG. 1 is a cut-away perspective view of a gas turbine engine including a turbine, the turbine includes turbine sections and at least one static vane assembly.

FIG. 1 is an illustrative aerospace gas turbine engine 100 cut-away to show that the engine 100 includes a fan assembly 102, a compressor 104, a combustor 106, and a turbine 108. The illustrative aerospace gas turbine engine 100 is used in aircraft. The fan assembly 102 pushes air through the engine 100 to propel the aircraft. The compressor 104 compresses and delivers air to the combustor 106. The combustor 106 mixes fuel with the compressed air received from the compressor 104 and ignites the fuel. The hot, high pressure products of the combustion reaction in the combustor 106 are directed into the turbine 108 and the turbine 108 extracts work to drive the compressor 104 and the fan assembly 102.

Figures 2, 3:
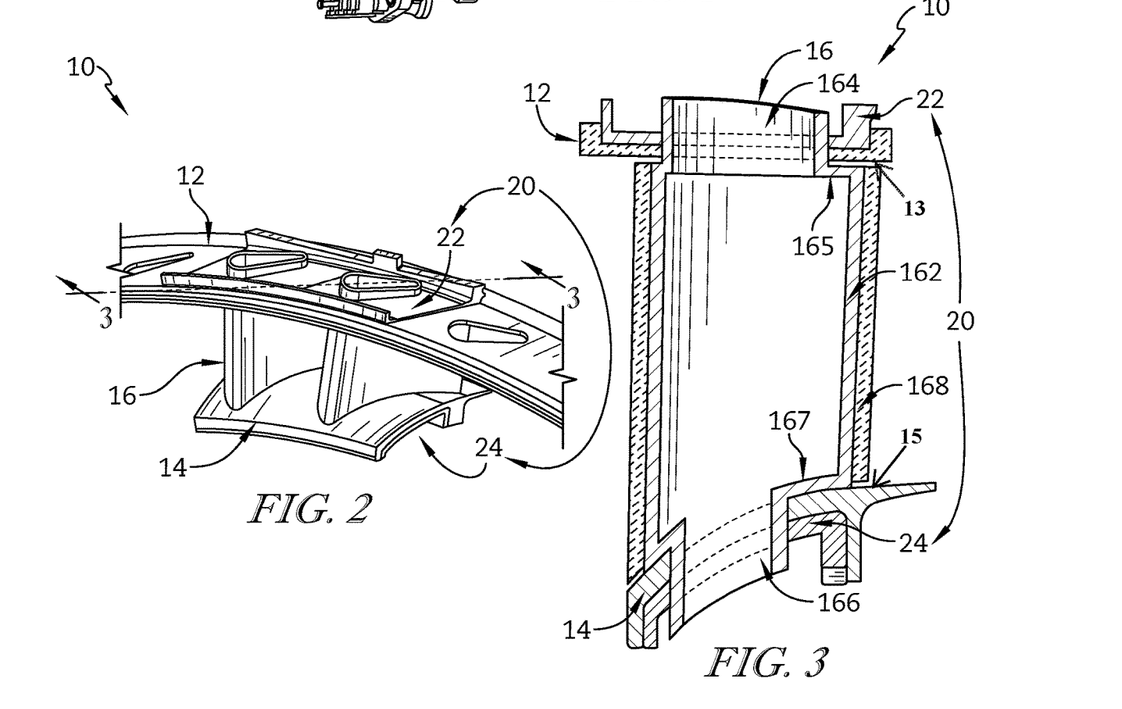
FIG. 2 is a detail view of FIG. 1 showing that the vane assembly includes an outer end wall having openings for receiving a plurality of spars positioned radially inward of the outer end wall and outer end caps coupled to the webs at an exterior of the outer end wall for holding the spars to the outer end wall.
FIG. 3 is a partial cross-sectional view of the vane assembly of FIG. 2 showing that the spars may be hollow to allow cooling air to flow through the spars and suggesting that an inner end wall positioned radially inward of the outer end wall cooperates with the outer end wall to form part of a flow path through the turbine section of the gas turbine engine.

The turbine 108 includes an outer shroud 107, one or more turbine sections 109 positioned within the outer shroud 107 to extract work from the hot, high pressure products flowing from the combustor 106, and one or more vane assemblies 10 (sometimes called vane rings) positioned to realign the flow of hot, high pressure products between the turbine sections 109 as shown in FIG. 1. The illustrative vane assembly 10 includes an outer end wall 12 having a flow surface 13, an inner end wall 14 having a flow surface 15 (only a portion of which is shown) positioned radially inward of the outer end wall 12 to define a flow path between the flow surfaces 13, 15 of the outer and inner end walls 12, 14, respectively, and a plurality of spars 16 coupled between the outer and inner end walls 12, 14 as shown in FIG. 2. The vane assembly also includes an attachment system 20 for holding the outer end wall 12, inner end wall 14, and spars 16 together.

The spars 16 are positioned within the flow path defined by the outer and inner end walls 12, 14 and have an airfoil shape to realign hot, high pressure products moving along the flow path toward an aft end of the gas turbine engine 100 as shown in FIG. 2. The attachment system 20 includes a plurality of outer end caps 22 and a plurality of inner end caps 24. The outer end caps 22 are coupled to the spars 16 to engage the outer end wall 12 and hold the spars 16 to the outer end wall 12 as shown in FIGS. 2 and 3. The inner end caps 24 are coupled to the spars 16 to engage the inner end wall 14 and hold the inner end wall 14 to the spars 16 and the outer end wall 12. Thus, the outer end wall 12, the spars 16, and the inner end wall 14 are positioned between the outer and inner end caps 22, 24.

In the illustrative embodiment, the spars 16 are hollow to allow a flow of cooling air through the spars 16 as shown in FIG. 3. However, in some embodiments, the spars 16 are not hollow. The spars 16 may be formed from metal, a metal alloy, or a ceramic material. The spars 16 each include a web section 162, an outer end connector 164, and an inner end connector 166. In some embodiments, a ceramic web skin 168 is coupled to an exterior surface of to the web section 162. For example, the spars 16 may be formed of a metallic material and the ceramic web skin 168 may be coupled to the web section 162 to protect the spars 16 from the hot, high pressure products moving along the flow path.

The outer end connectors 164 of the spars 16 extend through the outer end wall 12 and the outer end caps 22 as shown in FIG. 3. The inner end connectors 166 pass through the inner end wall 14 and the inner end cap 24. The outer and inner end caps 22, 24 couple to the outer and inner end connectors 164, 166, respectively, to secure the outer and inner end walls 12, 14 to the spars 16. In some embodiments, outer and inner end caps 22, 24 are formed of a metallic material and secured to spars 16 through one of welding, brazing, or a bi-cast joint. In other embodiments, a fastener is used.

Figure 4:
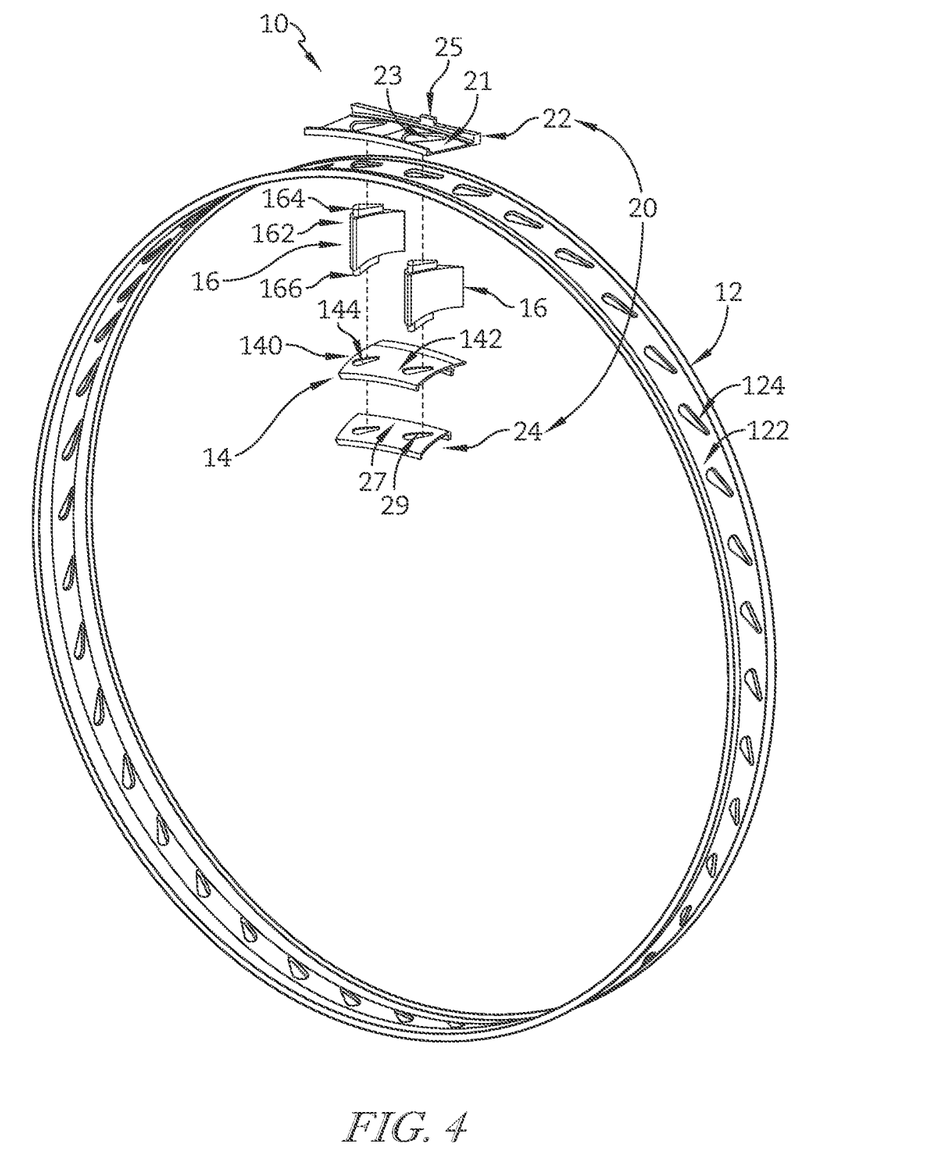
FIG. 4 is an exploded assembly view of the vane assembly of FIG. 1 showing that the spars are coupled to the outer end wall by the outer end caps and coupled to the inner end wall by inner end caps and suggesting that the outer end wall may be formed as a unitary structure while the inner end wall is formed of a plurality of segments.

The outer end wall 12 includes an annular body 122 which forms a one-piece continuous hoop and a plurality of locator holes 124 formed through the annular body 122 as shown in FIG. 4. The outer end wall 12 is formed from ceramic-matrix composite (CMC) materials. The locator holes 124 are sized to receive the outer end connectors 164 of the spars 16 to position the spars 16 circumferentially around the outer end wall 12.

Figure 7:
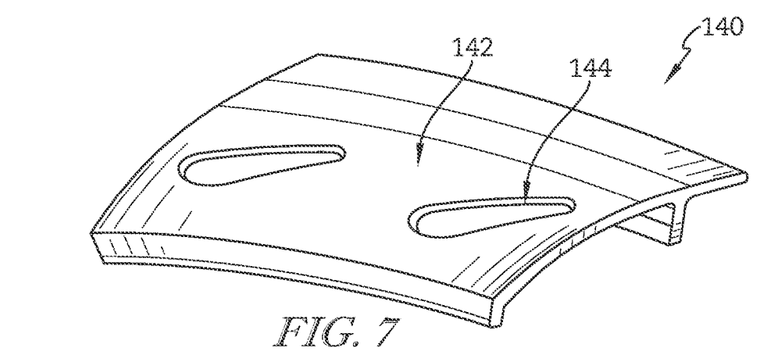
FIG. 7 is a detail perspective view of an inner end wall segment showing that the inner end wall segment includes a flow surface for guiding expanding gases along the flow path and locator holes for receiving the inner end connectors of the spars.

In the illustrative embodiment, the inner end wall 14 includes a plurality of segments 140 positioned to function as a continuous hoop radially inward of the outer end wall 12 as suggested in FIGS. 4 and 7. Each segment 140 includes a body 142 and at least one locator hole 144 formed through the body 142. The segments 140 may be formed from metal, a metal alloy, or a ceramic material. The locator holes 144 are sized to receive the inner end connectors 166 of the spars 16 to position the segments 140 relative to the spars 16. In the illustrative embodiment, each segment 140 includes two locator holes 144. However, the segments 140 may be larger or smaller and include more or less locator holes 144. In some embodiments, a seal (not shown) is coupled between adjacent segments 140.

Figure 6:
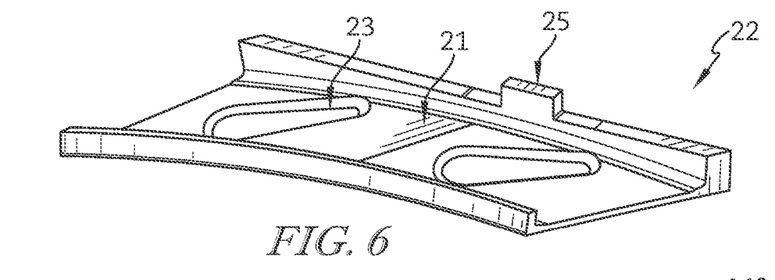
FIG. 6 is a detail perspective view of an outer end cap showing that the end cap includes a body for engaging the outer end wall and a locator tab coupled to the body and positioned to engage an outer case of the gas turbine engine to locate the vane assembly within the gas turbine engine.

The outer end caps 22 each include a body 21 and at least one connector-coupler hole 23 formed through the body 21 as shown in FIGS. 4 and 6. The connector-coupler holes 23 are sized to receive the outer end connectors 164 of the spars 16 and arranged to couple with the outer end connectors 164. For example, the outer end connectors 164 may fit through the connector-coupler holes 23 and then be welded, brazed, connected with a bi-cast joint or fastener, or otherwise coupled to the outer end cap 22. In the illustrative embodiment, each outer end cap 22 includes two connector-coupler holes 23. However, the outer end caps 22 may be larger or smaller and include more or less connector-coupler holes 23. In some embodiments, the outer end caps 22 further include a locator tab 25 coupled to the body 21 and positioned to engage with the outer shroud 107 to align the vane assembly 10 with the shroud 107.

Figure 8:
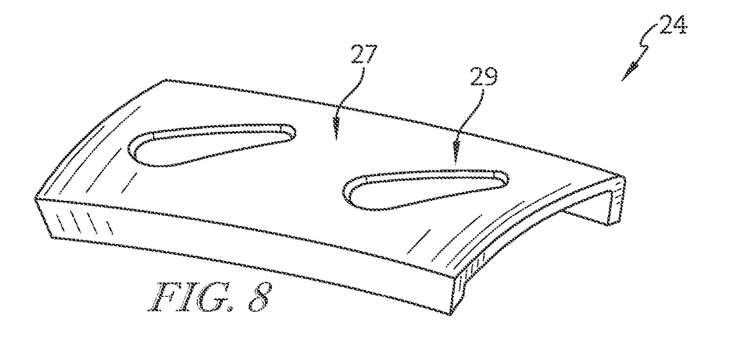
FIG. 8 is a detail perspective view of an inner end cap showing that the end cap includes a body for engaging the inner end wall and at least one coupler hole formed through the body and positioned to couple with the spars.

The inner end caps 24 each include a body 27 and at least one connector-coupler hole 29 formed through the body 27 as shown in FIGS. 4 and 8. The connector-coupler holes 29 are sized to receive the inner end connectors 166 of the spars 16 and arranged to couple with the inner end connectors 166. For example, the inner end connectors 166 may fit through the connector-coupler holes 29 and then be welded, brazed, connected with a bi-cast joint or fastener, or otherwise coupled to the inner end cap 24. In the illustrative embodiment, each inner end cap 24 includes two connector-coupler holes 29. However, the inner end caps 24 may be larger or smaller and include more or less connector-coupler holes 29.

Figure 5:
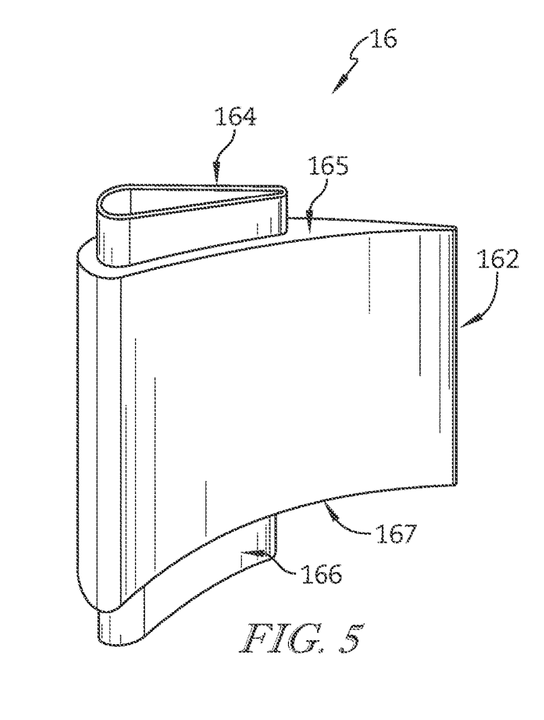
FIG. 5 is a detail perspective view of a spar showing that the spar includes a web section having an airfoil profile, an outer end connector coupled to the web section, and an inner end connector coupled to the web section and suggesting that the end connectors are positioned to pass through the outer and inner end walls to couple with the outer and inner end caps.

The outer and inner end connectors 164, 166 of the spars 16 are offset from an exterior surface of the web 162 to form an outer shoulder 165 and an inner shoulder 167 as shown in FIGS. 3 and 5. The outer shoulder 165 is sized to engage an inner surface of the outer end wall 12. The inner shoulder 167 is sized to engage an outer surface of the inner end wall 14. Thus, the outer and inner shoulders 165, 167 position the inner end wall 14 relative to the outer end wall 12, In some embodiments, the outer end wall 12 may be formed from a number of segments and the inner end wall 14 may be formed as a continuous one-piece hoop. In such embodiments, locator holes, end caps, and connectors inverted from those shown in the figures and described herein may be used to couple the vane assembly together.

To assemble the vane assembly 10, the outer end connectors 164 of the spars 16 are aligned with the locator holes 124 of the outer end wall 12 and the connector-coupler holes 23 of the outer end caps 22 as shown in FIG. 4. The inner end connectors 166 of the spars 16 are aligned with the locator holes 144 of the segments 140 and the connector-coupler holes 29 of the inner end caps 24. In the illustrative embodiment, a sub-assembly may be formed from one end cap 22, a portion of the outer end wall 12, two spars 16, one segment 140, and one inner end cap 24.

The sub-assembly may be temporarily clamped together while other sub-assemblies are assembled around the outer end wall 12. The outer and inner end caps 22, 24 may be coupled to the spars 16 once all of the sub-assemblies have been positioned to form the vane assembly 10. However, other assembly processes are contemplated. For example, the sub-assembly may be coupled together before other sub-assemblies are positioned. In another example, more or less spars 16 may be included in each sub-assembly, and the outer and inner end caps 22, 24 and segments 140 may be sized corresponding to the number of spars 16.

In some embodiments, the outer end wall 12 is formed from a plurality of segments, and the inner end wall 14 is formed as a continuous one-piece hoop. In some embodiments, the inner end wall 14 is metallic, the inner end caps 24 are omitted, and the inner end connectors 166 of the spars 16 are coupled to the inner end wall 14. In some embodiments, the outer end wall 12 is formed from CMC materials, the inner end wall 14 is formed from CMC materials, and the spars 16 include the ceramic web skin 168.

Figure 9:
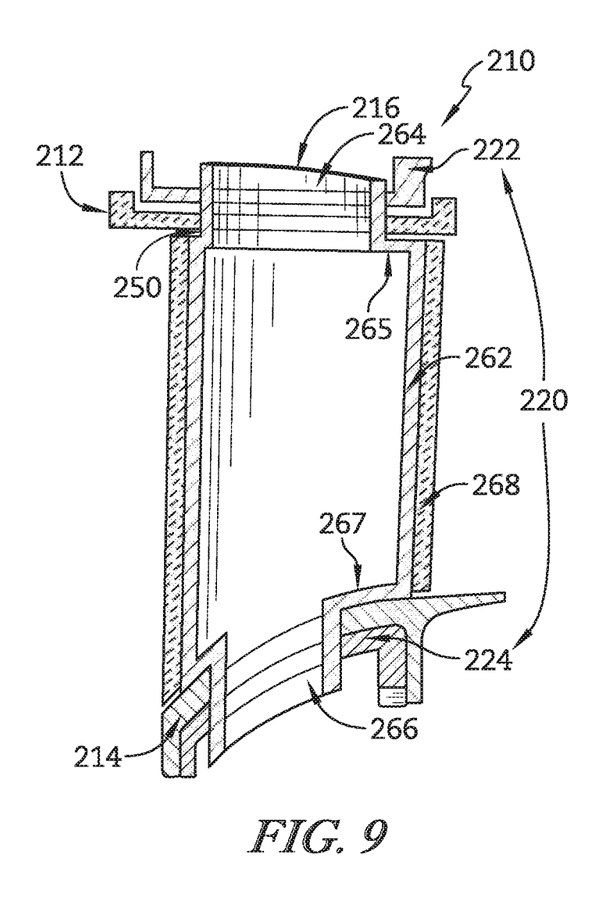
FIG. 9 is a partial cross-sectional view of a vane assembly showing that an outer end cap coupled to a spar is spaced from an outer shoulder of the spar to allow relative radial movement between the spar and an outer end wall.
Figure 10:
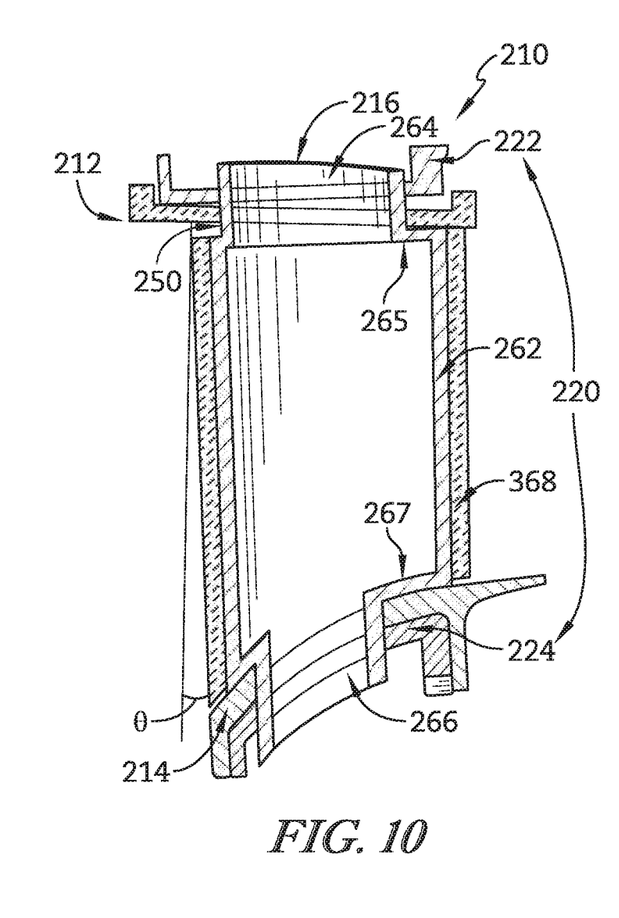
FIG. 10 is a similar view to FIG. 9 showing the spar and inner end wall tilted relative to the outer end wall which is maintained in the same orientation relative to an outer shroud of a turbine included in a gas turbine engine.

In one illustrative embodiment, an outer end wall 212 is formed as a continuous one-piece hoop which allows spars 216 to tilt relative to the outer end wall 212 as shown in FIGS. 9 and 10. The illustrative vane assembly 10 includes the outer end wall 212, an inner end wall 214 positioned radially inward of the outer end wall 212 to define a flow path between the outer and inner end walls 212, 214, and a plurality of spars 216 coupled between the outer and inner end walls 212, 214. The spars 216 are positioned within the flow path defined by the outer and inner end walls 212, 214 and have an airfoil shape to realign hot, high pressure products moving along the flow path toward an aft end of a gas turbine engine which is similar to the gas turbine engine 100.

An attachment system 220 includes a plurality of outer end caps 222 and a plurality of inner end caps 224 as shown in FIGS. 9 and 10. The outer end caps 222 are coupled to the spars 216 to engage the outer end wall 212 and hold the spars 216 to the outer end wall 212. The inner end caps 224 are coupled to the spars 216 to engage the inner end wall 214 and hold the inner end wall 214 to the spars 216 and the outer end wall 212. Thus, the outer end wall 212, the spars 216, and the inner end wall 214 are positioned between the outer and inner end caps 222, 224.

The spars 216 each include a web section 262, an outer end connector 264, and an inner end connector 266 as shown in FIGS. 9 and 10. In some embodiments, a ceramic web skin 268 is coupled to an exterior surface of to the web section 262. The outer end connectors 264 of the spars 216 extend through the outer end wall 212 and the outer end caps 222. The inner end connectors 266 pass through the inner end wall 214 and the inner end cap 224. The outer and inner end caps 222, 224 couple to the outer and inner end connectors 264, 266, respectively, to secure the outer and inner end walls 212, 214 to the spars 216.

The outer and inner end connectors 264, 266 of the spars 216 are offset from an exterior surface of the web 262 to form an outer shoulder 265 and an inner shoulder 267 as shown in FIGS. 9 and 10. The outer shoulder 265 is sized to engage an inner surface of the outer end wall 212. The inner shoulder 267 is sized to engage an outer surface of the inner end wall 214. Thus, the outer and inner shoulders 265, 267 position the inner end wall 214 relative to the outer end wall 212. The inner end wall 214 is formed from a plurality of segments positioned adjacent one another to form a continuous hoop. Each segment of the inner end wall 214 is coupled to at least one of the spars 216.

The outer end wall 212 is formed to include a plurality of locator holes 250 which are sized to receive the outer end connectors 264 of the spars 216 to position the spars 216 circumferentially around the outer end wall 212 as suggested in FIGS. 9 and 10. The outer end caps 222 are spaced from the outer shoulder 265 of the spars 216 to allow relative radial movement between the spars 216 and outer end wall 212. The outer end wall 212 may include an attachment point for coupling to an outer shroud of a turbine included in the gas turbine engine which is separate from an attachment point of the outer end caps 222.

In the illustrative embodiment, the outer end caps 222 are spaced from the outer shoulders 165 of the spars 216 and the locator holes 250 formed through the outer end wall 212 are sized such that the spars 216 can tilt relative to the outer end wall 212 as suggested in FIGS. 9 and 10. For example, the spars 216 may be positioned substantially perpendicular to the outer end wall 212 while the gas turbine engine is in a steady state cruising speed as shown in FIG. 9. The spars 216 may tilt toward an aft end of the gas turbine engine at an angle θ during increased take-off speeds of the gas turbine engine as shown in FIG. 10. The angle θ is within a range of about zero degrees to about 10 degrees. The spars 216 may tilt toward a fore end of the gas turbine engine at an angle in a range of about zero degrees to about 10 degrees during decreased idling speeds of the gas turbine engine. The outer end wall 212 is maintained in substantially the same orientation as the spars 216 tilt relative to the outer end wall 212.

The spars 216 may tilt due to the relative expansion and contraction of components within the gas turbine engine. The segments of the inner end wall 214 allow the inner end wall 214 to tilt with the spars 216. Seals may be positioned between adjacent segments of the inner end wall 214 which maintain sealing engagement with the segments even during tilting of the inner end wall 214. Seals may also be positioned between the outer end caps 222 and the outer surface of the outer end wall 212 which maintain sealing engagement even during tilting of the spars 216. Embodiments of the present disclosure may provide assemblies with the ability to tolerate axial misalignment of the inner and outer end wall assemblies.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A vane ring for use in a gas turbine engine, the vane ring comprising
    a plurality of metal spars, each spar including a web section having an airfoil shape, a first end connector coupled to a radially outer portion of the web section, and a second end connector coupled to a radially inner portion of the web section,
    a plurality of inner end wall segments positioned to function as a continuous hoop and engage the metal spars, each inner end wall segment including a first flow surface positioned to guide expanding hot gases along a flow path through the gas turbine engine and at least one locator hole sized to receive the second end connector of the metal spars, a unitary outer end wall forming a one-piece continuous hoop, the outer end wall comprising ceramic-matrix materials and including a second flow surface positioned to cooperate with the first flow surface of the inner end wall segments to form the flow path and a plurality of locator holes sized to receive the first end wall connectors to locate the metal spars circumferentially along the outer end wall, wherein the locator holes are sized to allow the metal spars to tilt relative to the inner end wall segment, and a plurality of inner end caps having an opening to receive the second end connectors and positioned to engage a radially inner surface of the inner end wall, wherein the opening has a geometry that is the same as a geometry of one of the plurality of locator holes.

2. The vane ring of claim 1, further comprising a plurality of outer end caps coupled to the first end connectors and positioned to engage a radially outer surface of the outer end wall.

3. The vane ring of claim 2, wherein the outer end caps are coupled to the first end connectors by one of welding, brazing, a bi-cast joint, or a fastener.

4. The vane ring of claim 2, wherein the outer end caps and inner end caps cooperating to locate the outer end wall, the metal spars, and the inner end wall segments between the outer and inner end caps.

5. The vane ring of claim 4, wherein the inner end caps are coupled to the second end connectors by one of welding, brazing, a bi-cast joint, or a fastener.

6. The vane ring of claim 2, wherein the outer end caps include a body for engaging the outer end wall and at least one locator tab coupled to the body and positioned to engage an outer case of the gas turbine engine to locate the vane ring within the gas turbine engine.

7. The vane ring of claim 1, wherein the first end connector is offset from an exterior surface of the web section that defines the airfoil shape of the web section to form a first shoulder for engaging the outer end wall to locate the metal spar relative to the outer end wall.

8. The vane ring of claim 7, wherein the second end connector is offset from an exterior surface of the web section that defines the airfoil shape of the web section to form a second shoulder for engaging the inner end wall segments to locate the inner end wall segments relative to the outer end wall.

9. The vane ring of claim 1, further comprising a plurality of ceramic web skins positioned to surround the web sections of the metal spars and located between the outer end wall and inner end wall segments, each web skin comprising ceramic-matrix materials and having an airfoil shape.

10. The vane ring of claim 1, wherein the inner end wall segments comprise ceramic-matrix materials.

11. The vane ring of claim 1, wherein the inner end wall segments comprise metallic materials.

12. A vane ring for use in a gas turbine engine, the vane ring comprising a plurality of metal spars, each spar including a web section having an airfoil shape and an end connector coupled to the web section, a unitary outer end wall forming a one-piece continuous hoop, the outer end wall comprising ceramic-matrix materials and including a flow surface positioned to guide expanding hot gases along a flow path through the gas turbine engine and a plurality of locator holes formed through the flow surface, the locator holes sized to receive the end connectors of the metal spars to locate the metal spars circumferentially along the outer end wall, wherein the locator holes are sized to allow the metal spars to tilt relative to the inner end wall segment, a plurality of ceramic web skins positioned to surround the web sections of the metal spars, and a plurality of outer end caps having an opening to receive the end connectors and positioned to engage a radially outer surface of the outer end wall, wherein the opening is sized to receive an outer-most perimeter of the end connector.

13. The vane ring of claim 12, further comprising a plurality of inner end wall segments positioned to function as a continuous hoop radially inward of the outer end wall and engage the metal spars, each inner end wall segment including a flow surface positioned to guide expanding hot gases along the flow path.

14. The vane ring of claim 13, wherein the ceramic web skins are positioned within the flow path between the outer end wall and inner end wall segments.

15. The vane ring of claim 12, wherein the outer end caps are coupled to the first end connectors by one of welding, brazing, a bi-cast joint, or a fastener.

16. The vane ring of claim 12, wherein the outer end caps include a body for engaging the outer end wall and at least one locator tab coupled to the body and positioned to engage an outer case of the gas turbine engine to locate the vane ring within the gas turbine engine.

17. The vane ring of claim 12, wherein the end connector is offset from an exterior surface of the web section that defines the airfoil shape of the web section to form a first shoulder for engaging the outer end wall to locate the metal spar relative to the outer end wall.

18. A vane ring for use in a gas turbine engine, the vane ring comprising a plurality of metal spars, each spar including a web section having an airfoil shape, a first end connector coupled to a radially outer portion of the web section, and a second end connector coupled to a radially inner portion of the web section, a unitary inner end wall forming a one-piece continuous hoop, the inner end wall comprising ceramic-matrix materials and including a first flow surface positioned to guide expanding hot gases along a flow path through the gas turbine engine and at least one locator hole sized to receive the second end connector of the metal spars, a plurality of outer end wall segments positioned to function as a continuous hoop and engage the metal spars, each outer end wall segment including a second flow surface positioned to cooperate with the first flow surface of the inner end wall to form the flow path and a plurality of locator holes sized to receive the first end connectors to locate the metal spars circumferentially along the outer end wall, wherein the locator holes are sized to allow the metal spars to tilt relative to the inner end wall segment, and a plurality of outer end caps having an opening to receive the first end connectors and positioned to engage a radially outer surface of the outer end wall.

19. The vane ring of claim 18, further comprising a plurality of inner end caps coupled to the second end connectors and positioned to engage a radially inner surface of the inner end wall.

* * * * *